Nov. 3, 1959 P. J. IMSE 2,911,091
PLASTIC FLAT TOP CONVEYER
Filed April 7, 1955 2 Sheets-Sheet 1
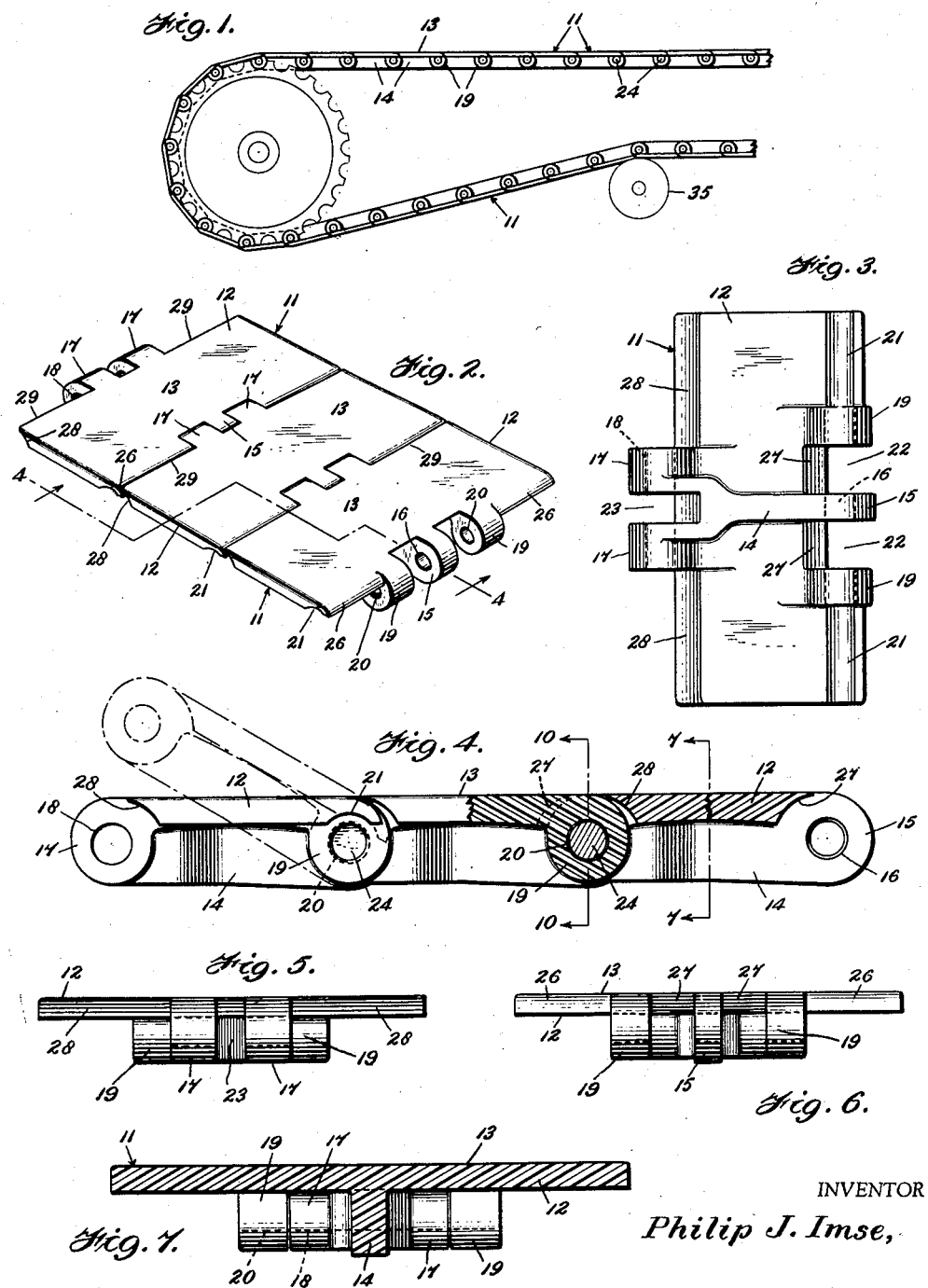
INVENTOR
Philip J. Imse,
BY
ATTORNEY

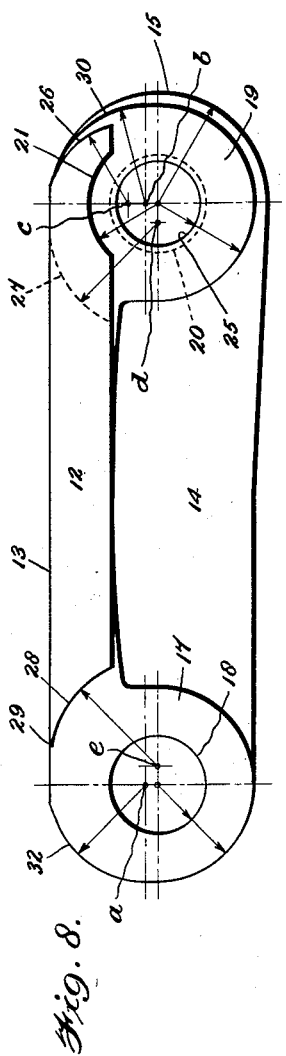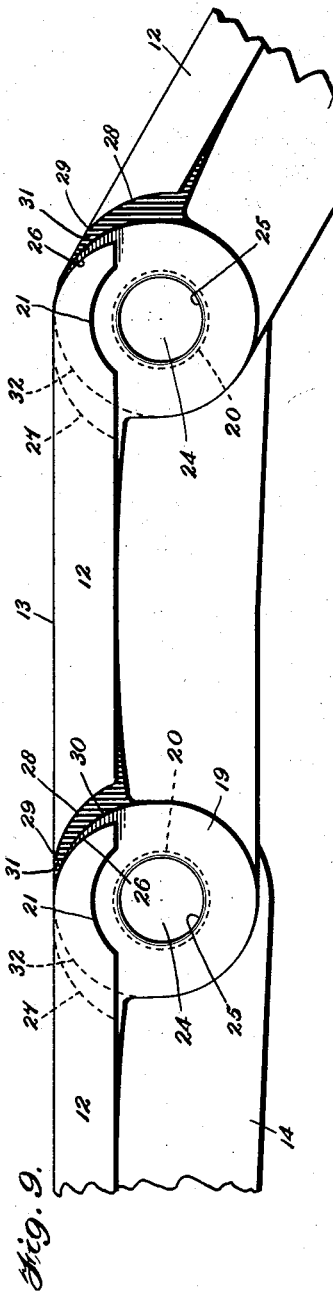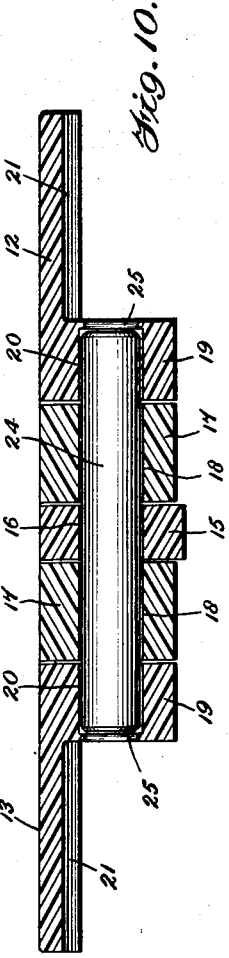

United States Patent Office 2,911,091
Patented Nov. 3, 1959

2,911,091

PLASTIC FLAT TOP CONVEYER

Philip J. Imse, Wauwatosa, Wis., assignor to Chain Belt Company, Milwaukee, Wis., a corporation of Wisconsin Application April 7, 1955, Serial No. 499,875

5 Claims. (Cl. 198—189)

This invention relates to power driven conveyers and has for its principal object the provision of an improved link for a specialized type of such apparatus, known to the industry as "flat top" conveyers, which are widely used in bottling and food processing plants for the mass transportation of cans, jars, bottles and similar containers to and from the various stations at which they are sterilized, filled, closed, sealed, etc., and also finds wide application in conveying various articles and packages in many other industries.

Heretofore the links for these conveyers have been made of metal, and as disclosed for example in the prior U.S. Patents No. 1,966,659 to Wynne et al., and No. 2,564,533 to Imse, they frequently have taken the form of rectangular sheet steel or stainless steel plates of approximately ⅛ inch in thickness and having cut and curled portions along their longer edges that provide interfitting knuckles through which chain pins are inserted to provide articulating joints between the adjoining links. The knuckles are tangent to one flat face of the plate but project outwardly beyond the opposite face thereof and when the links are assembled into a belt its outward face, in the straight belt runs, is substantially continuous and uniformly planar whereby bottles, jars, cans and similar containers may be received thereon and transported with a minimum danger of tipping or upsetting. The aligned and pinned knuckles, projecting only beyond the inward face of the belt, provide barrels which are receivable between the teeth of the sprockets about which the belt is trained, whereby the belt may be driven from any appropriate source of power.

Another type of flat top conveyer previously proposed and used has comprised a strand of conventional sidebar pintle or roller chain, to each link of which has been bolted, riveted or otherwise rigidly secured a flat rectangular metal plate, which plates also provide planar supporting surfaces for the containers in the straight runs of the belt but do not constitute any part of the articulating joints between adjoining links. Conveyers of this type are appreciably more expensive to manufacture than the first mentioned type. In the case of both types the end portions of the plates extend beyond the ends of the barrels provided by the pinned knuckles, or beyond the side bars of the chain links, and usually travel upon and are supported by fixed tracks or guides in the operative run of the conveyer.

It is a major object of the invention to provide a flat-top conveyer chain that can run satisfactorily without lubrication, when the nature of the articles being conveyed is such that contamination of such articles by grease or other lubricants is undesirable or renders the articles unsightly.

As previously indicated, these flat top conveyers are extensively employed in the bottling and similar packaging operations of food and beverage processing plants, and while they meet the requirements thereof quite well, the fact remains that in the handling of glass and analogous frangible containers a substantial amount of breakage of such containers occurs; and it is a further object of the present invention to provide a conveyer which will materially reduce such breakage. To this end a unitary flat top conveyer link formed of molded "plastic" material, such as nylon, has been evolved which extensive tests have demonstrated to be appreciably superior to the prior metal links as regards breakage of frangible containers, while at the same time operating as efficiently and having a wear resistance at least as great as such metal links. Other plastic materials having well known physical characteristics are suitable, and should be selected for the type of service contemplated. Such materials may be either thermoplastic or thermo-setting, and may be laminated for greater strength.

In food processing plants using metal containers progressing along a flat top conveyer, it is a usual practice to run the conveyers at a lineal speed faster than the processing machinery at the various stations can process the cans. This results in a "bunching up" ahead of the station and the conveyer slips along the bottoms of the cans and frequently scrapes off tin plate or other protective covering on the can bottoms. Accordingly, it is a still further object of the invention to provide a flat top conveyer having a non-abrasive top portion that will not scrape protective coatings from can bottoms.

For the purpose of facilitating the disclosure the invention has been illustrated in the accompanying drawings forming a part of this specification, in which like reference characters designate like parts throughout the views, and in which:

Figure 1 is a side elevational view, somewhat diagrammatic, of a portion of a flat top conveyer composed of links constructed in accordance with this invention;

Fig. 2 is a perspective view of several of the links in assembled relation;

Fig. 3 is an inverted plan view of one of the links;

Fig. 4 is an enlarged side elevational view of the links shown in Fig. 2, and partly in section on approximately the planes indicated by the line 4—4 in the latter figure;

Fig. 5 is an end elevational view of the parts shown in Fig. 4, as seen from the left thereof;

Fig. 6 is a similar elevational view as seen from the right of Fig. 4;

Fig. 7 is a cross sectional view, on the plane indicated by the line 7—7 in Fig. 4, looking in the direction of the arrows;

Fig. 8 is an enlarged side elevational view of one of the links, illustrating certain of the details of its construction;

Fig. 9 is an enlarged side elevational view of several links in assembled relation, illustrating certain features of their functioning; and Fig. 10 is an enlarged cross sectional view on the plane indicated by the line 10—10 in Fig. 4, looking in the direction of the arrows.

The present links 11 are all alike, whereby only a single mold form is necessary, and each of them comprises a flat rectangular plate-like body 12 having a planar upper surface 13 upon which the containers may be placed and rest. An integral rib 14 projects from the under side of the body 12, extending across it medially of its ends and terminating at one of the longer sides of the body in a rounded end portion 15 having a bore 16 for reception of a chain pin. Adjacent the opposite longer edge of the body said rib is bifurcated and terminates in a pair of spaced ears 17 having aligned bores 18 for receiving the chain pin. The first mentioned edge portion of the body 12 is also provided with a pair of integral ears 19, one to either side of and spaced from the rounded end portion 15 of the rib 14, which ears have pin receiving bores 20 aligned with the bore 16 of said rib portion. Outwardly of the ears 19 the under face of the plate 12 may be grooved, as at 21, to provide clearance for insertion and withdrawal of the chain pin.

The manner in which the links are assembled to form a flat top conveyer belt will be readily understood from Figs. 2 and 4. That is to say, the ears 17 of each link are introduced into the spaces 22 (Fig. 3) between the respective ears 19 and the rib end portion 15 of the adjoining link, such rib end portion being received in the space 23 between said ears 17, and when the bores 16, 18 and 20 of the several ears are aligned, a chain pin 24 is inserted therein. While such pins might be made of plastic material as are the links, it is preferred that they be of steel or similar metal as such pins are more rigid than plastic pins and thus impart more strength to the articulating joints and to the belt as a whole. Furthermore, if subjected to steam or water sprays (as these conveyers usually are, for cleaning purposes) plastic pins may tend to swell and cause binding of the joints unless the running clearances between such pins and the ears are increased to such an extent as to cause undesirable looseness in the belt in its normal operation.

The metal pins 24 may have running fits in all of the bores 16, 18 and 20 and thus "float" therein, as this distributes wear throughout the length of the pins rather than restricting it to only certain portions thereof as is the case if the pins are press-fitted in say the bores 18 and have running fits in only the bores 16 and 20. For ease in assembly and disassembly, the pins preferably are headless and are retained in operative position in the bores by means carried by certain of the ears. Thus, as best shown in Figs. 9 and 10, the outward ends of the bores 20 in the ears 19 are provided with integral circumferential beads 25 the internal diameter of which is slightly less than the diameter of the pin 24. The beads may be discontinuous if preferred, that is, one or more raised projections may be used instead of a continuous circumferential bead. The yieldability of the plastic material of the ears is sufficient that in assembly the pins (the ends of which may be slightly chamfered) may be readily forced past the bead at one end of a joint, to the position shown in Fig. 10, whereupon such bead will snap back to its initial shape and in conjunction with the companion bead at the other end of the joint will prevent unintentional displacement of the pin from the bores. On the other hand, a pin may be easily driven out past a bead by means of a punch and hammer, if it becomes necessary to disassemble the belt; and these operations may be repeated numerous times without destroying the efficacy of the beads.

While as above indicated, the resilience or yieldability of nylon and analogous plastics as compared with the previously used metal materially reduces the likelihood of breakage frangible containers, it is virtually impossible to completely eliminate all such breakage and since the plastics are more susceptible than metal to damage through cutting or scoring by glass fragments, especially in the articulating joints between adjoining links, the joints of the present links are so formed as to minimize this danger. That is to say, they are not only arranged to prevent the entry of substantially all but the smallest fragments of glass or other foreign matter into them, but they are also so constructed as to tend to discharge any such small fragments or particles as may unavoidably find their way into the joints.

To this end the several ears 17 and 19 are not truly circular, when viewed in end elevation as in Fig. 4, but are slightly elliptical, with the long axis of the ellipse being vertical as viewed in said figure. This is more clearly illustrated in the enlarged Fig. 8, from which it will be seen that the lower semicircumference of the respective ears 17 and 19 is an arc of 180° struck from centers corresponding to the articulating axes of the respective joints. The upper left hand quadrant 32 of the ears 17, and the upper right hand quadrant 30 of the ears 19, are arcs with the same radius as said semicircumferences but struck from centers $a$ and $b$ displaced vertically somewhat above the said articulating axes. At their upper ends the said quadrants merge with the planar top surface 13 of the plate 12. The rounded end 15 of the rib 14 is a semicircle struck from the articulating axis of the joint, with a radius equal to the distance from such axis to the planar supporting surface 13.

In addition to the ear formation just described, the edge portion of the plate 12 from the ears 19 outwardly to the respective ends of the plate, is curved downwardly from the top surface 13, as indicated at 26, the center of such curvature being indicated at $c$ in Fig. 8 as displaced still further above the joint axis than the previously mentioned center $b$. Furthermore, those portions of this edge of the plate which lie between the ears 19 and the rib 14 are arcuately beveled as indicated at 27, with the center of this arc being displaced horizontally to the left of the joint axis, as shown at $d$ in Fig. 8. The opposite edge of the plate 12 is similarly beveled as at 28, both between the ears 17 and from such ears to the ends of the plate, the center $e$ of such arc being horizontally displaced to the right of the joint axis, as shown in Fig. 8.

With the links ocnstructed as just described, upon assembly as shown in Fig. 9 the upper edge 29 of the arcuate bevel 28 of one link will lie in close proximity to the juncture of the planar surface 13 with the curved edge portion 26 of the plate and the upper quadrant 30 of the ears of the adjoining link. In actual practice, for links having a pitch of 1½ inches, along the edge 29 there will be a clearance 31 on the order of 1/64 of an inch between the bevel surface 28 of the one link and the complementary curved surfaces 26 and 30 of the adjoining link. However, because of the different radii and centers employed in generating the respective surfaces, the latter diverge from the planar surface 13 and thus progressively increase the clearance downwardly from such surface so that even in the straight-line position of the links shown at the left of Fig. 9, any glass fragments or other foreign particles small enough to enter the clearance 31 at the edge 29 will naturally tend to continue on through the clearance and be discharged from the lower end thereof. On the other hand, should larger fragments be forced into the narrow upper part of the clearance, as the links articulate in passing around the sprockets the clearance automatically increases, as shown at the right of Fig. 9, because the centers from which the several complementary curved surfaces are generated are eccentric to one another and to the axis of articulation; and this widening of the clearance, in conjunction with the relative movement between the surface 28 and the surfaces 26 and 30 incident to the articulation, tends to dislodge and discharge such caught fragments.

The same action will also take place as regards the arcuate bevels 27 and the complementary quadrants 32 of the ears 17; and thus the articulating joints of the belt tend to be self-clearing, thereby minimizing the possibility of damage to the plastic parts by frangible fragments.

As indicated in Fig. 1, the lower or return run of these belts is sometimes supported by rolls 35 mounted in such manner as to require some reflex articulation of the links 11. As shown in broken lines in Fig. 4, the present joints will accommodate such reflex movement up to approximately 30°.

The ribs 14 not only strengthen the body members 12 against bending or warping, thus preserving the flatness of the container-supporting surfaces 13, but since the respective ends of each rib are directly connected to adjoining chain pins the ribs take the major portion of the tensions and stresses incidental to the driving of the conveyor by the sprockets and prevent appreciable stretching of the body members under such stresses. The ribs provide the further advantage of serving as a projection to match with a slot in a sprocket so that the chain is guided at its longitudinal centerline as it articulates around the sprocket.

What is claimed is:

1. A flat top conveyor comprising a series of pivotally connected plastic links each of which comprises a rectangular plate-like body member having a planar container-supporting face and an integral stress-taking rib projecting from its opposite face and extending across the member intermediate the ends thereof, said member also having integral apertured ears projecting from its respective lateral edge portions, such ears being spaced along said edge portions for interfitting and alignment of the ears of one link with those of the adjoining links; a metal pin disposed in the aligned apertures of each interfitting set of ears to provide articulating joints between the respective links; and means projecting from the peripheral surface of certain of the ear apertures and engageable with said pin to prevent its displacement from the apertures.

2. A flat top conveyor comprising a series of identical unitary plastic links each of which comprises a rectangular plate-like body member having a planar container-supporting face and an integral stress-taking rib projecting from its opposite face and extending medially across said member from one lateral edge thereof to the other, said member also having integral apertured ears projecting from said opposite face at each of said lateral edges, said ears being spaced along the respective edges for interfitment and alignment of the apertures of the ears of each link with those of the adjoining links, one end of said rib being integrally connected to the ears at one edge of the body member and the other end of the rib being disposed between and spaced from the ears at the other edge of the member and provided with an aperture aligned with the apertures in such ears; a metal pin disposed in the aligned apertures of each set of interfitted ears to provide articulating joints between the respective links; and means for preventing displacement of the pin from its apertures comprising integral yieldable pin-engaging projections extending inwardly from the peripheral surface of certain of the ear apertures, such projections being temporarily deformable by the pin through forced movement thereof to operative position in the alined ear apertures.

3. A flat top conveyor comprising a series of identical unitary plastic links each of which comprises a rectangular plate-like body member having a planar container-supporting face and an integral stress-taking rib projecting from its opposite face and extending medially across said member from one lateral edge thereof to the other, said member also having a pair of integral apertured ears projecting from said opposite face at each of said lateral edges, said ears being spaced along their respective edges for interfitment and alignment with the ears of the adjoining links, one end of said rib being integrally connected to the pair of spaced ears at one edge of the body member and the other end of said rib being disposed between and spaced from the pair of ears at the other edge of said member and provided with an aperture aligned with the apertures in such ears; a metal pin disposed in the aligned apertures of each set of interfitted ears to provide articulating joints between the respective links, said pin having a running fit in all of said apertures; and means for retaining said pins in operative position in their apertures comprising integral portions of certain of said ears which project inwardly from the peripheries of their apertures in position for engagement with the ends of the pin, such ear portions being temporarily deformable by forcible movement of the pin past them to or from its operative position in the apertures.

4. A flat top conveyor for frangible containers and the like, comprising a series of articulately connected plastic links each of which includes a rectangular plate-like body member having a planar container-supporting face, said links being provided with integral interfitting ears projecting from the respective lateral edges of their body members which ears are provided with aligned apertures for the reception of a chain pin, said ears and lateral edges of the body members having complementary eccentric arcuate faces arranged to provide running clearances between the articulating parts of adjoining links which clearances progressively increase in width from said planar supporting faces whereby frangible fragments entering the clearances from said faces will be automatically discharged therefrom and thereby prevent damage to the plastic links; and a chain pin disposed in the apertures of each set of interfitting ears to complete the articulating joint between their links.

5. A flat top conveyor for frangible containers and the like, comprising a series of articulately connected plastic links each of which includes a rectangular plate-like body member having a planar container-supporting face, said links being provided with integral interfitting ears projecting from the respective lateral edges of their body members which ears are provided with aligned apertures for the reception of a chain pin, said ears being of elliptoid conformation and said lateral edges of the body members being formed with arcuate surfaces which are eccentric to the axis of articulation of the joint, said edge surfaces and portions of the surfaces of the elliptoid ears providing running clearances between the complementary articulating parts of adjoining links, which clearances progressively increase in width from said planar supporting faces whereby frangible fragments entering the clearances from said faces will be automatically discharged therefrom and thereby prevent damage to the plastic links; and a chain pin disposed in the apertures of each set of interfitting ears to complete the articulating joint between their links.

References Cited in the file of this patent

UNITED STATES PATENTS

| | | |
|---|---|---|
| 848,236 | Ginaca | Mar. 26, 1907 |
| 1,641,515 | Williams | Sept. 6, 1927 |
| 1,769,336 | Detaint et al. | July 1, 1930 |
| 1,882,393 | Fassnacht | Sept. 8, 1931 |
| 2,360,257 | Muller et al. | Oct. 10, 1944 |
| 2,564,533 | Imse | Aug. 14, 1951 |